Dec. 1, 1953
A. TAUB
2,660,860
VARIABLE SPEED AND DIRECTION POWER UNIT
Filed May 15, 1950
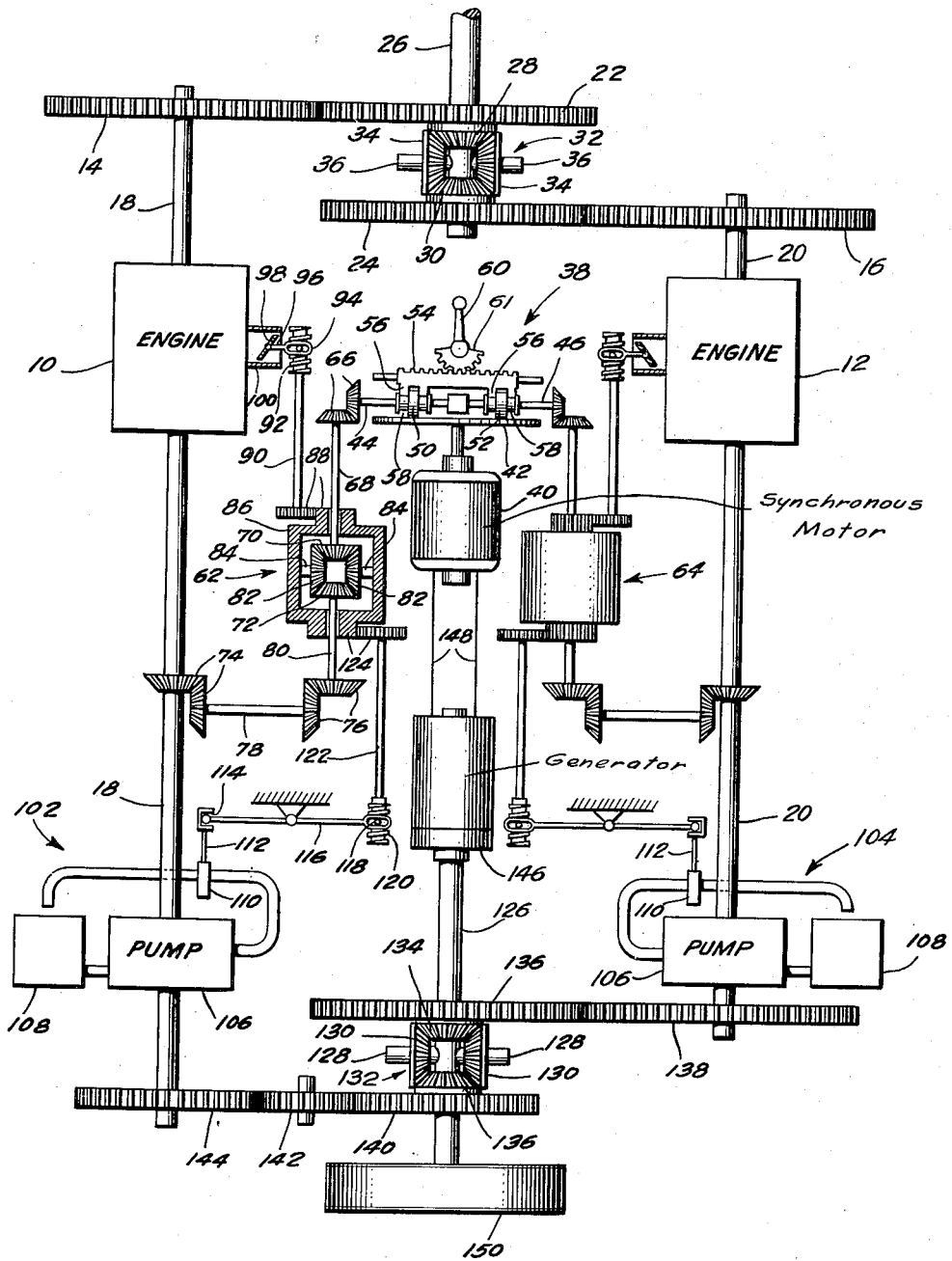
INVENTOR.
ALEX TAUB
BY
ATTORNEY Patented Dec. 1, 1953

2,660,860

UNITED STATES PATENT OFFICE 2,660,860

VARIABLE SPEED AND DIRECTION POWER UNIT

Alex Taub, Washington, D. C., assignor to Taub Engineering Company, Washington, D. C., a corporation of Delaware Application May 15, 1950, Serial No. 162,062

5 Claims. (Cl. 60—97)

This invention relates to a variable speed and direction power-pack, and more particularly, to a mechanical combination of power units and gearing to provide a selectively reversible power output shaft of infinitely variable speed, and also a constant speed power output shaft.

Heretofore, such devices have been in use wherein an electric motor drives a hydraulic pump which, in turn, drives a reversible hydraulic motor; the whole deriving power from an engine generator set remote from the device.

The present invention makes possible the elimination of electrically driven power units to provide operation without a supply of electricity, and would be used, by way of example, for operating weapons independent of each other or of a central power station.

Also, this invention makes possible the direct coupling of an engine to gear units, thereby eliminating power conversion steps and requiring considerably less fuel for storage or in a moving supply which is an extremely important factor in the supply problem for weapons. Moreover, since weapons or special machines may have to be used in extreme cold, the heat of the engine, which is normally wasted, will have many uses.

Other advantages of the invention will be apparent from the following description and accompanying drawing, which is a schematic showing of the power-pack embodying this invention.

Referring now to the drawing, there is shown a power-pack having twin internal combustion engines 10 and 12, rotating in opposite directions. Gears 14 and 16 on the output shafts 18 and 20, respectively, of the engines mesh with and drive in a 1-to-1 ratio corresponding gears 22 and 24 that are rotatably mounted on a power-pack output shaft 26. Concentrically secured to the opposed faces of the gears 22 and 24 are the opposite bevel gears 28 and 30, respectively, of a differential gear unit 32, having the pinion gears 34 thereof mounted on stub shafts 36 secured radially on the power-pack output shaft 26.

Hence, when the engines 10 and 12 are rotating at the same speed, the bevel gears 28 and 30 rotate at the same speed, but in opposite directions, so that the pinion gears 34 do not revolve orbitally about the axis of the bevel gears. When the engines 10 and 12 run at different speeds, however, the pinion gears 34 revolve orbitally and so rotate the power-pack output shaft 26 at a speed proportional to the difference in speed between the two engines, and in a direction dependent upon which engine is running faster. With the 1-to-1 driving ratio shown, the speed of the power-pack output shaft 26 is one half of the speed difference between the engines, since the torque of the output shaft 26 must equal the sum of the torques of the bevel gears 28 and 30 with a corresponding reduction in speed of such shaft to one half of the difference in speed between the bevel gears.

Hence, by the use of a compensator speed regulator for the twin engines 10 and 12 for varying their speed equally and oppositely from a predetermined equal speed, the speed of the readily reversible power output shaft 26 may be varied with great precision. Such a compensating speed control is indicated generally at 38, but it will be realized that the particular arrangement shown is for illustrative purposes only. In general, there can be used any servo-type control able to vary the speed control of the power units to maintain the relative power unit speeds needed for a certain output speed.

In the embodiment illustrated, the compensating speed control 38 has a constant speed synchronous electric motor 40, powered by a source of electrical energy later described, rotating a flat disc 42. Splined to axially aligned rotatable shafts 44 and 46, disposed diametrically of the disc 42, are a pair of rollers, 50 and 52 respectively, that bear against the face of the disc on diametrically opposite sides of its axis. Hence, rotation on the disc 42 drives the shafts 44 and 46 in opposite directions. A rack 54 is mounted for longitudinal slideable movement parallel to shafts 44 and 46. Projecting from the rack 54 are two spaced pairs of ears 56, the ears of each pair straddling a corresponding roller 50 or 52 and closely fitting into circumferential grooves 58 formed in reduced portions of the rollers on opposite sides of their disc-engaging surfaces. Hence, longitudinal movement of the rack 54, by an operating handle 60 of a pivoted segmental control gear 61, shifts the rollers 50 and 52 equal distances axially along their driven shafts 44 and 46. When the rollers are equally spaced from the axis or center of the disc 42, the speeds of the shafts 44 and 46 are equal, but axial shifting of the rollers by the rack 54 will change the shaft speeds equally and oppositely and by an amount proportionate to the movement of the rack.

Each of the two shafts 44 and 46 drives a bevel gear of a separate differential gear unit 62 and 64. Since the operation of each of these differential gear units 62 and 64 is identical, a description of the unit 62 will suffice. The shaft 44, through appropriate gears 66 and a shaft 68, drives the bevel gear 70 of the differential unit 62. The other bevel gear 72 of the unit 62 is driven in an opposite direction by the power output shaft 18 of the engine 10 by an appropriate drive train of gears 74 and 76, and shafts 78 and 80. The drives for the two bevel gears 70 and 72 are arranged so that they are driven at equal speeds in opposite directions when the control handle 60 is in "neutral" position, i. e. the rollers 50 and 52 are equidistant from the axis of the disc 42. The pinion gears 82 of the differential unit 62 are mounted on stub shafts 84 secured to the interior of a rotatable housing 86 journalled on the shafts 68 and 80. Hence, the housing 86 is stationary when the bevel gears 70 and 72 are rotating at the same speed, but a difference in speed between the latter causes the housing 86 to rotate.

Such rotational movements of the housing 86 are used to control the speed of the engine 10, as by a suitable connection, such as the meshing gears 88, one of which is secured to the housing 86, shaft 90, worm 92, follower 94 and lever 96, with the butterfly valve 98 in the intake manifold 100 of the engine. Thus, for example, when the control handle 60 is rotated clockwise from a neutral position, the rack 54 moves to the left, thus speeding up the bevel gear 70 relative to the gear 72 of the differential unit 62. The resulting orbital movement of the pinion gears 82 rotates the housing 86 in a direction to cause the butterfly valve 98 to open more, thus effecting an increase in speed of the engine 10. Such speed increase increases the speed of the bevel gear 72 of the differential unit 62, so that when the speed of the gear 72 equals that of the gear 70, further rotation of the housing 86 ceases and the butterfly valve 98 is brought to rest in a position corresponding to that of the control handle 60. Likewise, movement of the control handle 60 in a counterclockwise direction, decreases the speed of the engine 10.

The speed of the engine 12 is controlled through the differential gear unit 64 by an associated system of shafts, gearing, and levers identical with those described for controlling the speed of engine 10. The control handle 60 however, effects equal and opposite control of the speeds of the two engines 10 and 12, so that when one is slowed down, the other is speeded up a proportionate amount. When the control handle 60 is in "neutral," both engines run at a predetermined equal speed, for example, one half of their maximum speed, and the power-pack output shaft 26 is stationary. Movement of the control handle 60 out of neutral position, however, causes the shaft 26 to turn in a direction dependent upon whether the control handle 60 is right or left of its neutral position and at a speed proportionate to the extent of movement of the control handle from its neutral position. Hence, the speed of the power-pack output shaft is infinitely variable. The predetermined equal speed of both engines is pre-set into the compensator speed control 38, but may be changed by varying the speed of the electric motor 40 or varying the spacing between the rollers 50 and 52 by an extensible rack.

Since a differential gear unit is essentially a torque balancing device, the greater torque of the faster of the two engines 10 and 12 acting through the differential unit 32, tends to speed up the slower of the two engines, i. e. increase its speed above the speed thereof effected by the compensating speed control 38. Additionally, no torque output can be had from a differential driven in this manner without reaction torque on the slower drive side. Some reaction will be provided by the dragging torque of the slower engine (its friction horsepower). In order to hold down the speed of the slower engine and also, to provide the necessary reaction torque for the faster engine to deliver to the shaft 26 a torque greater than this "dragging torque," each engine drives an adjustable torque absorber which may be a loadable hydraulic pump, a loadable electric generator, an adjustable friction brake, or other appropriate means for absorbing or counteracting the speed-accelerating torque imparted to the slower engine through the differential gear unit 32.

For illustrative purposes, such torque absorbers are herein shown as hydraulic pump units 102 and 104 driven by the power output shafts 18 and 20 of the engines 10 and 12. Each pump unit has a pump 106 receiving liquid from a sump 108 and returning liquid to the latter through a conduit having a variable flow restriction 110 therein controlled by a stem 112. Since both pump units 102 and 104 are controlled in an identical manner by the compensating speed control 38, a description of the control mechanism for the pump unit 102 will suffice for both.

The flow-restriction control stem 112 of the unit 102 has a recess 114 therein. One end of a pivoted lever 116 is received in the recess 114 while the other end of the lever has a follower 118 riding in a worm 120 on a rotatable shaft 122. Hence, rotation of the shaft 122 in one direction will further restrict the flow from the pump 106 and increase the torque necessary to drive the latter, i. e. in another sense, apply a braking or dragging force to the engine shaft 18. Meshing gears 124, one of which is fixed to the housing 86 of the differential gear unit 62, effect rotation of the shaft 122 to vary the flow restriction 110 in accordance with the direction of rotation of the housing 86. Therefore, this control mechanism for the pump unit 102 is so arranged that when the speed of the engine 10 is at the corresponding speed of the shaft 68, the restriction to flow in the unit 102 is not increased, but when the speed of the engine 10 is above the corresponding speed of shaft 68, determined by operation of the control handle 60, the consequent rotational movements of the housing 86 of the differential unit 62 act to restrict flow in the unit 102 to a degree substantially proportionate to the speed of the engine 10 above the corresponding speed of shaft 68. In other words, the braking or dragging force applied to the engine 10, i. e. torque absorption, is respectively increased or decreased substantially in proportion to its speed error above or below the correct speed determined by the compensator. Since the pump unit 104 is controlled by an identical mechanism connected to the differential gear unit 64, the greater torque of the faster engine will not speed up the slower above its correct compensated speed, because the greater torque is counteracted and balanced by the reaction torque of the slower engine and the reaction torque of the torque absorber driven by the slower engine. Hence, the speed of the power-pack output shaft 26 is correctly governed by the control handle 60 of the compensating speed control 38.

The linkages for operating the engine speed controls or throttles and torque absorbers are so coordinated that torque absorption begins as the throttles alternately approach the closed position from neutral. In other words, the flow restrictions 110 offer practically no resistance to flow when both engines are operating at their predetermined equal speed, but act to restrict flow in the unit 102 or 104 in proportion to the speed of the slower engine below the equal speed. Further, a spring or lost motion connection (not shown) is provided in each throttle linkage, in order to absorb or eliminate forces acting on this linkage during the continued movement of the torque absorber linkage with the throttle closed.

The governing effect of the torque absorbers 102 and 104 is supplemented by the action of a constant speed shaft 126, having radial stub shafts 128 mounting the orbital pinion gears 130 of a differential gear unit 132, the bevel gears 134 and 136 of which are rotatably mounted on the shaft 126. One bevel gear 134 of the unit 132 has a gear 136 concentrically secured thereto, and driven in a 1-to-1 ratio by a gear 138 fixed on the power output shaft 20 of the engine 12. The other bevel gear 136 of the differential unit 132 has a gear 140 concentrically secured thereto and driven in the same direction as the gear 136 by an idler gear 142, meshing with a gear 144 mounted on the power output shaft 18 of the engine 10. The gears 140 and 144 are of equal diameter so that the gear 144 drives the gear 140 in a 1-to-1 ratio.

Since the bevel gears 134 and 136 of the differential gear unit 132 are driven in the same direction, and at the same speed as the power output shafts 20 and 18, respectively, the shaft 126 is rotated by the orbital gears 130 at a speed proportional to the sum of the speeds of the engines 10 and 12, which sum is constant because of the action of the compensating speed control 38. Therefore, for the driving ratios shown, the shaft 126 is driven at a constant speed equal to one half of the sum of the speeds of the engines 10 and 12.

Driven by the constant speed shaft 126 is an electric generator 146 which supplies power, by conductors 148, to the synchronous electric motor 40 employed as a "time keeper" or constant speed reference in the compensator speed control 38. Preferably, a flywheel 150 is mounted on the shaft 126.

The generator 146 and/or the flywheel 150 constitute rotary inertia means that supply an inherent temporary torque reaction for the bevel gears 134 and 136 of the differential unit 132, so that a change in speed of one engine, either an increase or decrease, tends to correspondingly decrease or increase the speed of the other engine. Hence, the constant speed rotary inertia means effects accurate and fast response of the power-pack output shaft 26 to the movements of the speed control handle 60.

It will be realized that various changes may be made in the specific example shown and described for the purpose of disclosing this invention without departing from the principles thereof. Therefore, this invention includes all modifications encompassed within the spirit and scope of the following claims:

1. A variable speed and direction power drive comprising: a pair of power units; a differential gear unit having opposite gears and an orbital gear with said opposite gears connected to said power units for drive thereby in opposite directions and for power takeoff from said orbital gear; compensator means associated with said power units for changing their speed equally and oppositely from a predetermined equal speed; and a pair of adjustable torque absorbers each driven by one of said power units and both connected to said speed compensator for adjustment thereby to vary the resistance to each power unit in accordance with its speed.

2. A variable speed and direction power drive comprising: a pair of power units; a differential gear unit having opposite gears and an orbital gear with said opposite gears connected to said power units for drive thereby in opposite directions and for power takeoff from said orbital gear; a second differential gear unit having opposite gears and an orbital gear with said opposite gears of said second gear unit connected to said power units for drive thereby in the same direction; inertia means driven by said orbital gear of said second differential gear unit; and speed compensator means associated with said power units for changing their speed equally and oppositely from a predetermined equal speed.

3. A variable speed and direction power drive comprising: a pair of power units; a differential gear unit having opposite gears and an orbital gear with said opposite gears connected to said power units for drive thereby in opposite directions and for power takeoff from said orbital gear; a second differential gear unit having opposite gears and an orbital gear with said second gear unit opposite gears connected to said power units for drive thereby in the same direction; inertia means driven by said orbital gear of said second differential gear unit; speed compensator means associated with said power units for changing their speed equally and oppositely from a predetermined equal speed, and a pair of adjustable torque absorbers each driven by one of said power units and both connected to said speed compensator for adjustment thereby to vary the resistance to each power unit inversely to its speed.

4. The combination defined in claim 2 in which the inertia means comprise an electric generator and a synchronous electric motor powered thereby, the speed compensator means including said motor as a constant speed reference therefor.

5. The combination defined in claim 1 in which the power units are internal combustion engines rotating in opposite directions.

ALEX TAUB.

References Cited in the file of this patent

UNITED STATES PATENTS

| Number | Name | Date |
|---|---|---|
| 695,005 | Sponsel | Mar. 11, 1902 |
| 1,886,975 | Profitlich | Nov. 8, 1932 |
| 2,195,139 | Waseige | Mar. 26, 1940 |
| 2,252,545 | Benz | Aug. 12, 1941 |